United States Patent [19]

Pierrel et al.

[11] 4,303,262

[45] Dec. 1, 1981

[54] LARGE DIAMETER PIPE JOINT WITH MEANS FOR DISTRIBUTING TENSILE FORCES

[75] Inventors: Michel Pierrel, Pont-A-Mousson; Jean-Pierre Vitel, Blenod Les Pont-A-Mousson, both of France

[73] Assignee: Pont-A-Mousson S.A., Nancy, France

[21] Appl. No.: 91,998

[22] Filed: Nov. 7, 1979

[30] Foreign Application Priority Data

Nov. 13, 1978 [FR] France .................. 78 31994

[51] Int. Cl.³ .............................................. F16L 27/00
[52] U.S. Cl. .................................... 285/232; 285/184; 285/374; 285/415
[58] Field of Search .............. 285/374, 403, 404, 184, 285/232, 415

[56] References Cited

U.S. PATENT DOCUMENTS

| | | | |
|---|---|---|---|
| 1,976,983 | 10/1934 | Chandler | 403/DIG. 5 |
| 4,033,613 | 7/1977 | Bram | 285/184 |
| 4,194,769 | 3/1980 | Bram | 285/403 |

FOREIGN PATENT DOCUMENTS

| | | | |
|---|---|---|---|
| 1318671 | 1/1962 | France | 285/374 |
| 2159581 | 6/1973 | France | . |
| 2304018 | 10/1976 | France | 285/374 |
| 492615 | 9/1938 | United Kingdom | 403/DIG. 5 |

*Primary Examiner*—Dave W. Arola
*Attorney, Agent, or Firm*—Sughrue, Mion, Zinn, Macpeak and Seas

[57] ABSTRACT

A large diameter pipe joint in which the male end and the female mouth end have respective opposite load bearing surfaces 5, 22 between which are arranged bracing means capable of evenly distributing tensile forces over the whole periphery of the joint by means of an incompressible mass 27 of an initially fluid filler material. The mass is contained in a space sufficiently closed on all sides by an annular component 23 disposed between the two support surfaces 5, 22 to be impermeable to said filler material. This joint is particularly suitable for large diameter pipes laid in trenches, where the axes of adjacent pipe sections lie at a small acute angle to each other after installation.

7 Claims, 5 Drawing Figures

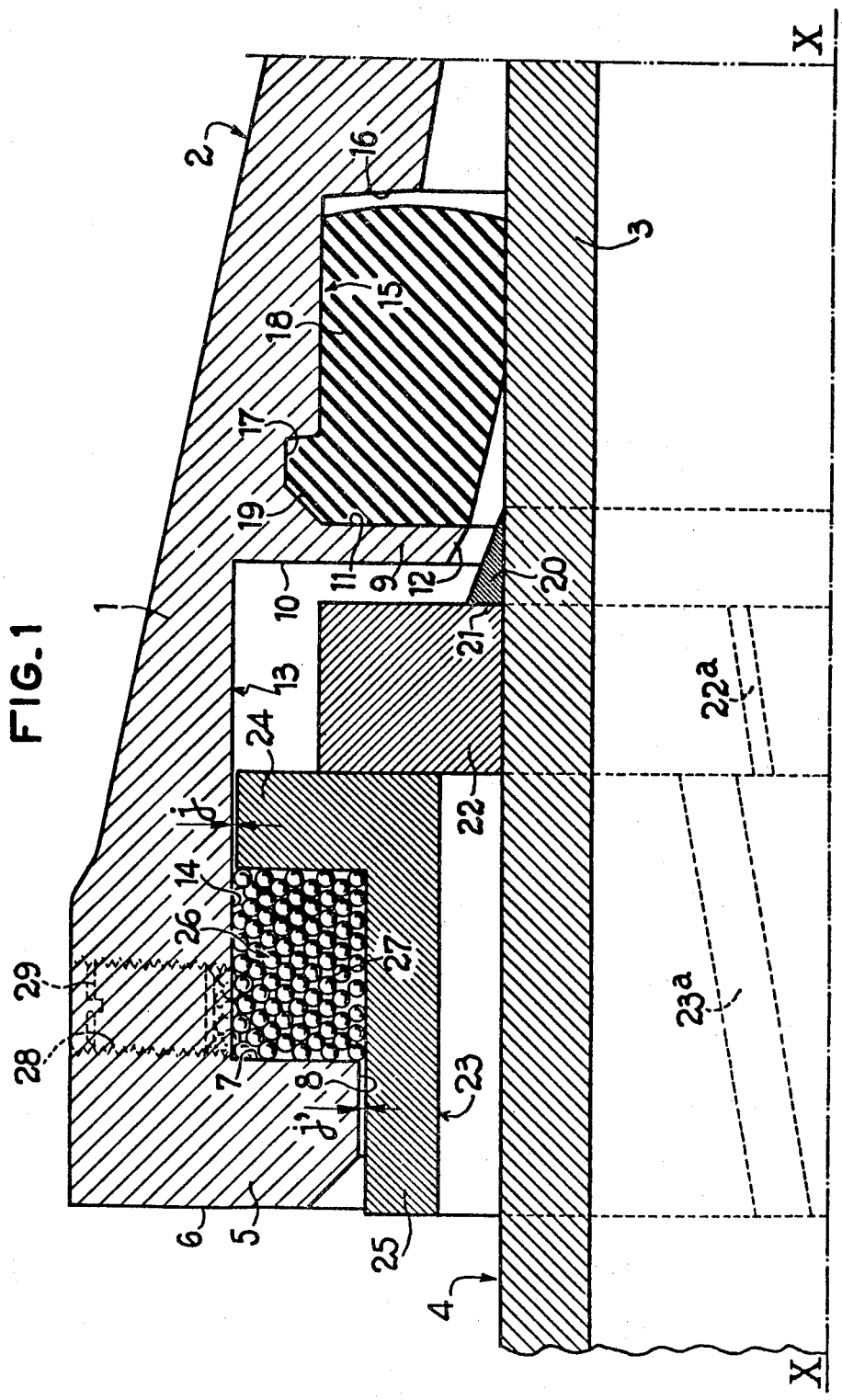

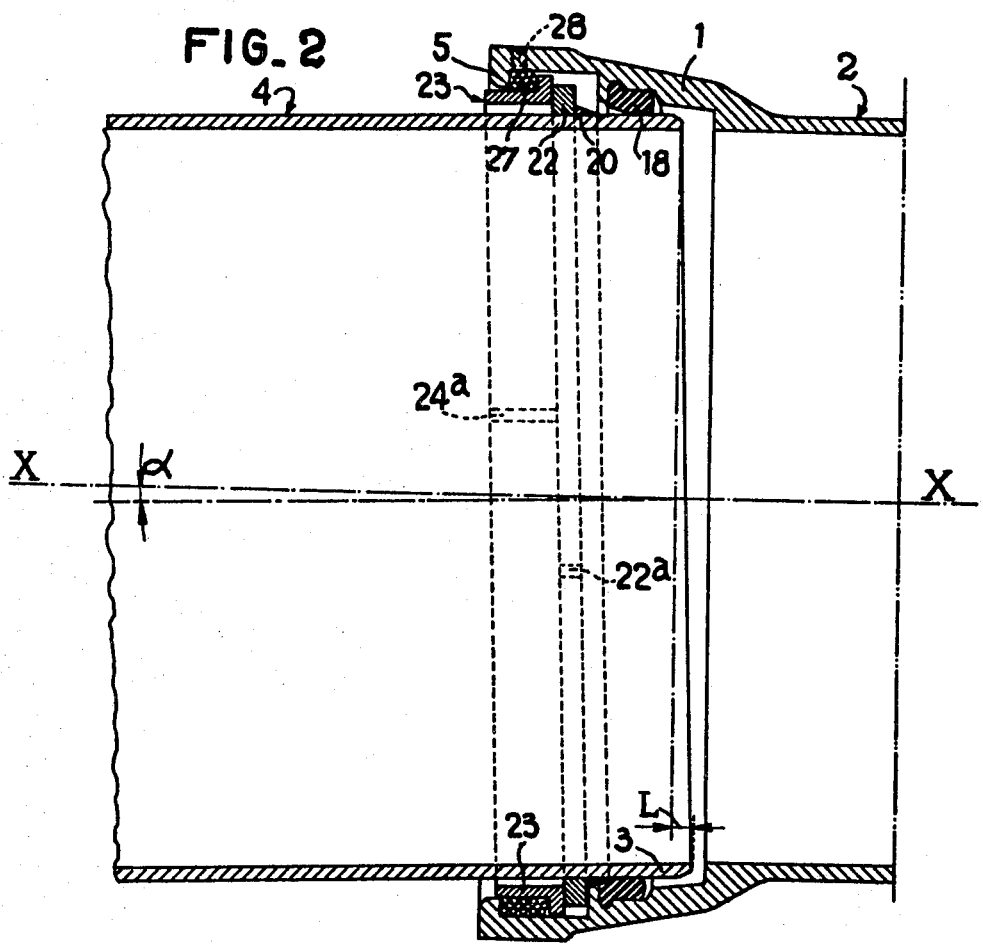
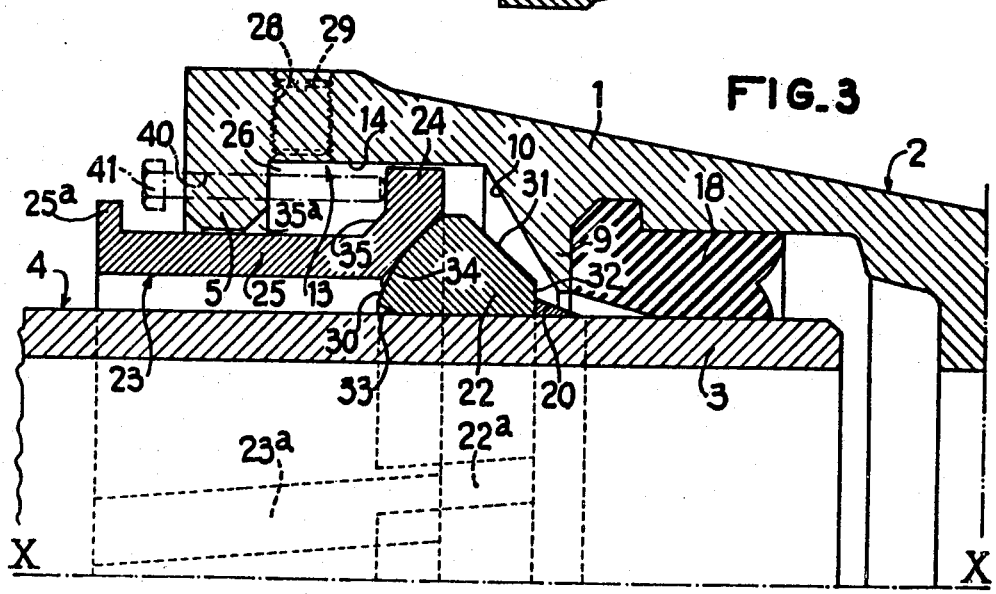

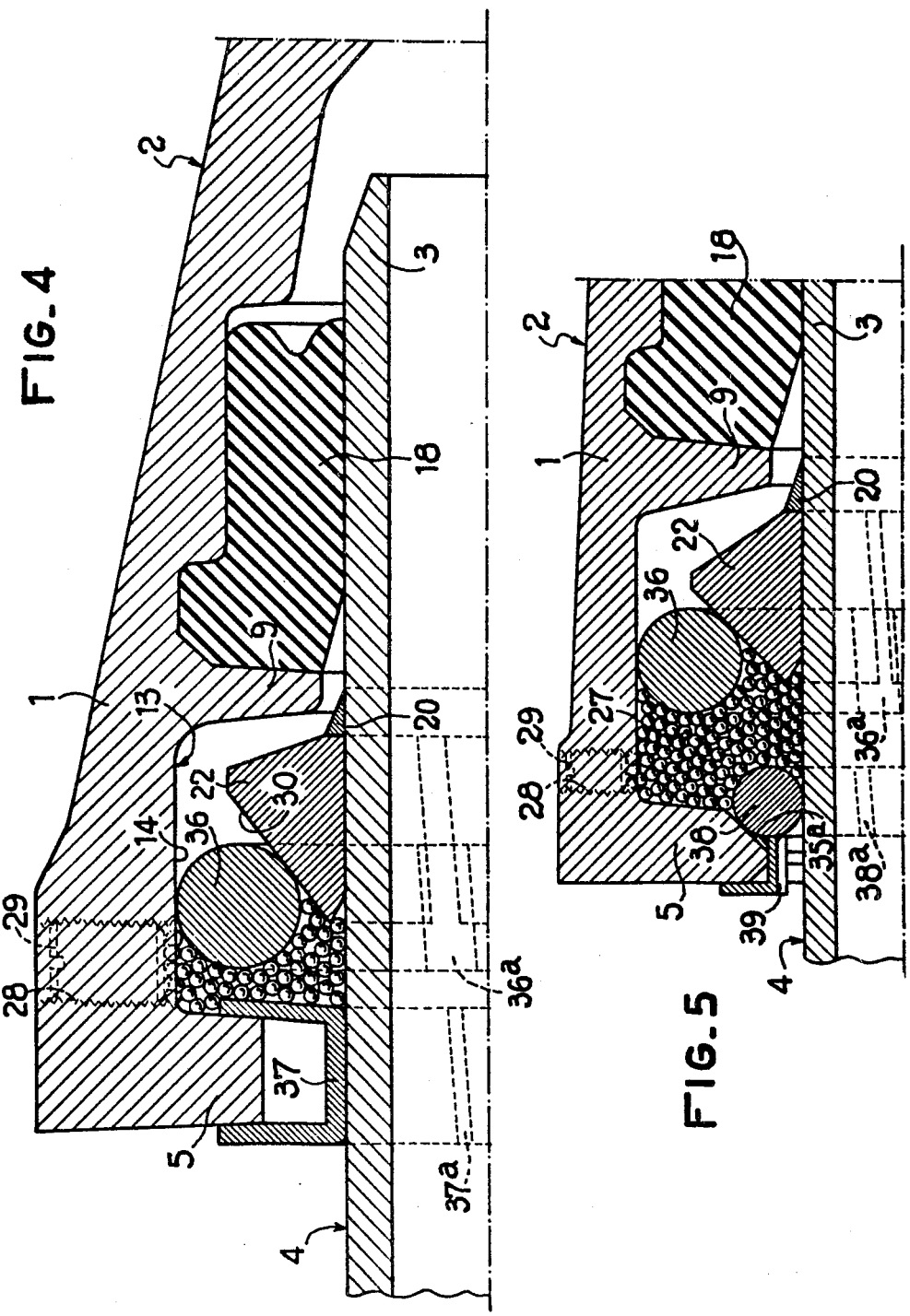

LARGE DIAMETER PIPE JOINT WITH MEANS FOR DISTRIBUTING TENSILE FORCES

BACKGROUND OF THE INVENTION

The present invention relates to large diameter pipe joints between two pipes where there is a possibility of the two pipes not being perfectly aligned with each other, and in particular to joints wherein the male end and the mouth have respective opposite support surfaces between which bracing means are arranged which are capable of distributing tensile forces over the entire periphery of the joint to prevent said forces from being focused on and breaking a smaller portion of the joint, and which comprise an incompressible mass of an initially fluid material. The support surface of the mouth is defined by a flange inside said mouth and the support surface of the male end is defined by a split guard ring which encloses said male end and bears against a radial shoulder thereof. In particular, the invention is used in large diameter, fluid-carrying high pressure pipes laid in trenches, wherein a small unpredictable misalignment is practically inevitable.

French Pat. Nos. 2,159,581 and 2,304,018 disclose joints of the above-mentioned type. In these known joints the incompressible mass occupies all the available space in the mouth cavity and, because this space is open, must be composed of a hardenable material.

SUMMARY OF THE INVENTION

The object of the present invention is to provide better economy of the filler material, and a joint of the above-described type which can adjust within limits to settling terrain, etc. while still providing uniform distribution of tensile forces. For this purpose, the invention provides that the incompressible mass is contained in a space closed on all sides in such a manner as to be impermeable to said filler material by means of annular components completely disposed between the two support surfaces.

In a first embodiment, said annular components comprise a flange with an L-shaped cross section which is slidable with radial play inside the opening of the flange of the mouth and inside the cylindrical bottom of the cavity of said mouth.

In a further embodiment, the support surface of the male end is truncated or spherical and said space is closed on the side of the split annular guard ring by a toroidal ring supported on this guard ring and on the cylindrical bottom of the mouth cavity, whereas on the side of the mouth opening, said space can be closed either by a U-profile ring covering said flange and possibly provided with a filling material or by a second toroidal ring which bears against the external surface of the male end and against a chamferred, radially internal, part of the support surface of the mouth.

It will be noticed that in each of these embodiments the hardenable material required in the known joints is replaced entirely or in part by a granular material such as metallic granules or bearings which give greater resistance to compression.

BRIEF DESCRIPTION OF THE DRAWINGS

FIG. 1 is a cross-sectional half view of a joint of the invention, wherein the two pipes are perfectly aligned;

FIG. 2 is a complete view on a very small scale of this joint with the two pipes in their final positions;

FIG. 3 is a view analogous to FIG. 1 showing a different joint embodiment;

FIG. 4 similarly shows a further embodiment of the large diameter pipe joint of the invention; and FIG. 5 shows a variation of the joint of FIG. 4.

DETAILED DESCRIPTION OF THE PREFERRED EMBODIMENTS

The joint shown in FIG. 1, with a general X—X horizontal axis, connects the mouth 1 of a first pipe 2 and the male end 3 of a second pipe 4 inserted into the mouth 1. The pipes 2 and 4 have a large diameter, for example 800 mm or more, and are intended to carry fluids under high pressure, for example 10 bars.

The mouth 1 has at its entry an internal flange 5 delimited by radial walls 6 and 7 and defining a cylindrical central opening 8. The outer wall 6 of this flange 5 is chamfered to facilitate introduction of the male end 3 and the various other components of the joint. The mouth 1 also has a second internal flange 9 with radial walls 10 and 11 delimiting an opening 12 of a diameter considerably less than that of opening 8. The radially inward wall of this opening 12 converges towards the interior of the mouth.

A first groove 13 with a cylindrical surface 14 is delimited between the flanges 5 and 9. A second groove 15 is provided on the opposite side of flange 9 and has an inner end defined by a radial wall 16. The groove 15 includes a recess 17 with an enlarged diameter in the vicinity of the flange 9. The sealing of the joint is ensured by a radial compression gasket 18 having a heel 19 lodged in recess 17 of the groove 15.

On the periphery of the male end 3, at a certain distance from its extremity, a circular or discontinuous weld ring 20 is provided having a radial surface 21 facing away from the end of the pipe. The diameter of the ring 20 is very much less than that of the opening 8 of the mouth 1 and, when the male end is in the inserted position in the mouth, this weld ring is approximately opposite flange 9 of said mouth.

The joint thus described is completed by a compressive coupling device composed of two rigid annular components and an incompressible filling mass. The first annular component is a split guard ring 22 with a square or rectangular cross section which encloses the male end 3 and bears against the surface 21 of the weld ring 20. The external diameter of this guard ring 22 is considerably greater than the entry diameter of the mouth 1.

The second annular component is a ring 23 having an L-shaped cross section. A radial branch or heel 24 of the L is inside the mouth and is defined by two annular radial surfaces one of which bears against the adjacent surface of the guard ring 22; the free end of this branch 24 slides with a small amount of radial play j along the cylindrical surface 14 of the groove 13 of the mouth. The other branch or skirt 25 of the L, perpendicular to the preceding branch, slides in the entry opening 8 of the mouth 1 with radial play j' of the same order as play j. The inside diameter of the branch 25 is greater than the exterior diameter of the weld ring 20.

The annular space 26 of approximately rectangular cross section between the walls 7 and 14 of the groove 13 on the one hand and the internal angle of the ring 23 on the other hand, is filled with a granular material 27 introduced through a threaded radial opening 28 in the wall of the mouth 1 near the flange 5. A threaded plug 29 is screwed into the opening 28. The diameter of the particles comprising the filler material 27 is more than double the width of the plays j and j'. The material 27 can be composed of metal granules, or preferably as shown, of steel bearings having a diameter of a few millimeters, for example of from 5 to 6 mm.

Ring 23 has a split 23a which is closed, for example by soldering.

The mounting of the joint of FIG. 1 is effected as follows:

The gasket 18 is put in place in the groove 15 in the mouth 1 and the ring 23 is contracted radially until branch 24 of the L has a diameter sufficiently small to pass through the opening 8. When said passage is effected, the ring 23 is released and split 23a is filled, for example by soldering, to make the ring continuous over its entire periphery with the desired diameter to provide the radial plays j and j' as mentioned above. Then in the same manner the split guard ring 22 is introduced into the groove 13, beyond the ring 23, and is then extended radially, said state being maintained by means of a wedge (not shown) introduced axially into its split 22a. These operations can be carried out in advance at the factory.

The male end 3 can then be introduced without difficulty into the mouth, through components 23 and 22. When the weld ring 20 has passed through the guard ring 22, the wedge for maintaining the latter in extension is removed in such a way that said guard ring encloses the male end at a short distance from the weld ring 20. During its introduction, the male end radially compresses the gasket 18, thus ensuring an automatic sealing of the joint.

These operations are effected when the two pipes are in perfect alignment along the X—X axis, in such a manner that the orientation of the parts is as represented by the solid lines in FIG. 1. The two pipes are then given the planned misalignment or are allowed to assume the misalignment which the practical conditions of the site impose, for example the imperfect surface of the bottom of the trench where the pipe line is laid. This misalignment causes an intersection of the axes of the two pipes in the median plane of gasket 18, as shown in FIG. 2.

In practice, the misalignment between two successive pipes is very low, on the order for example of 1.5° maximum, and is therefore almost imperceptible. However, when the pipes have a large diameter, for example 1600 mm, the axial displacement between the components of the guard ring 22 situated respectively inside and outside the angle of the two pipes is L=1600×tangent 1.5°=1600×0.026=41.6 mm. The result is a very considerable modification of the shape of the space 26: from uniformly annular, this space assumes a wedge-shaped configuration. As shown in FIG. 2, the axial length of the space 26 inside the angle of the pipes (at the bottom of FIG. 2) is greater by nearly 42 mm than this axial length outside of this angle (at the top of FIG. 2).

When the two pipes are in their final positions, the space 26 is filled with the granular material 27, for example by injection under pressure through the opening 28 of the mouth, and this material is then tightly packed, by vibration or other suitable means, the bearings possibly being lubricated in advance for this purpose. During this filling, the material 27 pushes the ring 23 against the guard ring 22 so that at the end of this filling the ring 23 is coaxial to the male end 3. This angular movement of the ring 23 is allowed for by the plays j and j', which are thereby altered in shape at the periphery of the joint.

The plays j and j' are unable to double in value, and therefore always remain smaller than the diameter of the filling material bearings. It is thus ensured that none of the bearings can escape from space 26, neither towards the interior of the mouth nor towards the exterior. Finally the filling opening 28 is closed by the plug 29. It is clear that when, under the effect of operating pressure, the male end 3 tends to withdraw from the mouth 1, the tensile forces will be effectively transmitted from the weld ring 20 to the flange 5 over the entire periphery of the joint by the guard ring 22, the branch 24 of the ring 23 and the filler material 27.

The embodiment shown in FIG. 3 differs from that shown in FIGS. 1 and 2 by the shape of the guard ring 22 and of the ring 23.

In this embodiment, the support surface provided by the guard ring 22 to the ring 23 is a convex surface 30 having a large radius resembling a truncated cone. Also, a side cut 31 is arranged at the intersection of the radial support surface 32 against the weld ring 20, which enables the adjacent surface 10 of the flange 9 of the mouth to be inclined and shortened, with a consequent savings of material. Finally a chamfer 33 is provided at the intersection of the convex surface 30 and the internal diameter of the guard ring, in order to facilitate the introduction of the male end. Thus, the guard ring 22 has a cross section which is roughly triangular with rounded angles.

Additionally, the L-shaped angle of the ring 23 is chamfered or rounded to form a truncated support surface 34 to bear against the convex surface 30 of the guard ring 22 as well as to provide a small angular surface 35 in the inner angle of the ring. To ensure constant axial length of the space 26, a chamferred surface 35a of the same angle as the surface 35 is provided on the inner edge of the flange 5 of the mouth 1. The slope on the X—X axis of the surfaces 34, 35 and 35a is on the order of 45°. In addition, the end of the skirt 25 outside the mouth is provided with an external radial flange 25a.

The assembly of this joint is carried out in the same manner as that of FIG. 1. However, because of flange 25a, it is possible to introduce ring 23 into the mouth and, after closing its split 23a, to fill the annular space 26 with granular material (not shown) at the fractory. This filling should be carried out when the heel 24 is approximately at the mid-point of the groove 13 in the mouth. After the filling opening 28 is closed, the pipe 2 can be transported without the risk of bearings escaping from space 26; to keep the bearings from collecting in the lower part of the mouth, spacing wedges (not shown) can be arranged between flanges 5 and 25a.

During the mounting of the joint shown in FIG. 3, if the space 26 is prefilled as described above, once the two pipes are in their final relative angular position, the ring 23 can be shaken or otherwise vibrated to redistribute the bearings to ensure good peripheral support. This can be done by artificially applying tensile forces on the male end. For this purpose, any appropriate separation device can be used such as the apparatus described in French Pat. No. 2,263,443 possibly aided by a vibrator.

In operation, this embodiment presents certain advantages due to the sloping of the contact surfaces 30 and 34:

the effect of the reaction forces is concentrated on the weld ring 20, which removes or reduces the tendency of the guard ring 22 to roll over the ring 20 toward the extremity of the male end. The high slope shown excludes all risk of breaking the mouth or radially crushing the male end under high pressure;

the slope of the support surfaces 30-34 has a tendency to push the ring 23 back into the angle formed by walls 7 and 14 of the groove 13 of the mouth, which is advantageous in closing space 26 so as to be impermeable to the filler material; and the slope of the support surfaces 30 and 34 enables the absorption of a certain part of the misalignment by relative sliding of these two surfaces, which in turn enables the reduction of the length of space 26, and therefore that of the mouth. Additionally, plays j and j' can be reduced as can, consequently, the diameter of the bearings or the like composing filler material 27.

Also, in accordance with an unshown embodiment, an angular L-shaped ring like that in FIG. 1 can be used with an approximately hexagonal guard ring 22 like that in FIG. 3.

FIGS. 4 and 5 show another method of closing the space 26. In these drawings, the guard ring 22 is the same as in FIG. 3, although its support surface 30 can be planar instead of spherical, but the ring 23 is replaced by another device. In these two cases, a torus 36 closes space 26 on the inside of the mouth 1, bearing against the surface 30 of guard ring 22 and against surface 14 of the groove 13 of the mouth.

In the embodiment shown in FIG. 4, space 26 is closed off from the open end of the mouth by a U-shaped annular component 37 which encloses the male end 3, covers flange 5 and can possibly be provided with an appropriate filling material.

In FIG. 5 the annular profile 37 is replaced by a second torus 38 wedged between the male end 3 and the chamferred side 35a of flange 5. This torus 38 is held against flange 5 by a plurality of sheet-iron elbow-shaped claws 39 fixed to its outside surface.

These two embodiments have the same method of operation as the two preceding ones. However, it is necessary to close splits 36a, 38a and 37a of the tori 36, 38 and of the profile 37 to ensure a proper seal before filling space 26, unless of course the two tori are made of an extensible material such as an elastomer. In such a case, when split 22a of the guard ring 22 is closed, space 26 would be perfectly sealed and could be filled with a liquid.

In the joints of FIGS. 1 to 3, it could happen that, as a result of friction, the misalignment of the pipes may not automatically cause complete tilting of ring 23 relative to the mouth and that consequently the contact between said ring and the guard ring 22 is not provided over the entire periphery. To avoid such an occurrence, as shown by the broken lines in FIG. 3, the flange 5 closing the mouth can contain a certain number of threaded axial holes 40 through which pass screws 41. The screwing of these screws, when the two pipes are in their final positions, pushes ring 23 until it has continuous peripheral contact with the guard ring 22. Then the screws 41 can either be left in place, if there is no fear that they will hinder the filling of the bearings through hole 28, or removed, either in such a way that they will no longer project into space 26 or completely, in which case they would be replaced by plugs.

This auxiliary device 40-41 for placing ring 23 in the correct support position on guard ring 22 can also be used for the placement of the torus 36 of FIGS. 4 and 5.

In all cases where the filler material 27 remains fluid, as is the case with metallic bearings, it is to be hoped that if the pipes are accidentally moved, for example following settling of the terrain, this material will automatically carry out, at least partially, peripheral redistribution restoring effective support over the whole circumference of the joint.

In each of the embodiments shown, the radial surface 21 against which the guard ring 22 is supported can be achieved by different means. For example, it can be a split rectangular or square cross section guard ring lodged into a groove also of rectangular cross section cut into the outer surface of the male end 3. This support surface 21 can also be composed of a raised surface formed integrally with the male end, or can even constitute the leading edge of a sleeve pushed onto the male end and provided at the opposite end with a radial heel.

We claim:

1. A watertight joint between a male end of one pipe and a mouth end of a second pipe, where there is a possibility of the two pipes not being perfectly aligned with one another, comprising: sealing means between said male end and said mouth end, respective opposite support means on said male end and said mouth end, bracing means arranged between said opposite support means for distributing tensile forces over the complete periphery of the joint and comprising an incompressible mass of an initially fluid filler material comprising solid spherical particles and at least one annular bearing element, and wherein the support means of the mouth end is defined by an inside flange (5) of the mouth end and a radial wall thereof and that of the male end is defined by a split guard ring (22) encircling said male end and bearing against a radial shoulder (21) of said male end and against said annular bearing element, and means containing said incompressible mass within said joint in an annular space defined between a pair of axial bearing surfaces including said radial wall of said mouth end and said annular bearing element, said annular space allowing redistribution of said incompressible mass upon misalignment of said pipes, a further annular space being defined between said annular bearing element and an interior radial flange (9) of said mouth.

2. The watertight locking joint of claim 1, wherein said means containing said incompressible fluid mass of solid spherical particles (26, 27) includes said radial wall (7) of said radial flange (5) at the mouth (1) entry, an inside cylindrical bottom (14) of the mouth (1) and cylindrical and radial walls of said annular bearing element (23) constituted by a ring, out of contact with the outside wall of the male end of the pipe (4), a radial play being maintained between the outer cylindrical walls of the male end of the pipe (4) and the inside cylindrical wall of said bearing element (23).

3. The joint of claim 2, wherein the split guard ring (22) on the pipe (4) includes a convex bearing surface (30) while the bearing ring (23) comprises a truncated bearing surface (34) in contact with the convex bearing surface (30).

4. The joint of claim 2, wherein a portion of the bearing ring (23) extends through the mouth (1) and is provided with a radial flange (25a) thereon which is turned radially outwardly.

5. The joint of claim 1, wherein the bearing surface (30) of the split guard ring is truncated or spherical and wherein the means containing said incompressible mass within space (26) includes a bearing element (36) bearing on said guard ring and on the cylindrical bottom (14) of the cavity (13) of the mouth (1).

6. The joint of claim 5, wherein the means containing said incompressible fluid mass of solid particles (27) in said annular space (26) includes a second ring (38) bearing on the external surface of the male end (3) and on a truncated radially inner portion (35a), of the bearing surface (7) of mouth (1).

7. The joint of claim 1, wherein the annular space (26) containing a mass (27) of spherical particles contains a radial orifice (28) for filling said space (26) with said spherical particles, said radial orifice (28) traversing the wall of the mouth (1) of the assembled pipe.

* * * * *